UNITED STATES PATENT OFFICE.

OTTO GRAUL AND GOTTFRIED HANSCHKE, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCING HALOGENATED PARAFFIN HYDROCARBONS.

1,032,822.   Specification of Letters Patent.   Patented July 16, 1912.

No Drawing.   Application filed March 30, 1912. Serial No. 687,454.

*To all whom it may concern:*

Be it known that we, OTTO GRAUL and GOTTFRIED HANSCHKE, subjects, respectively, of the Grand Duke of Anhalt and of the King of Prussia, residing at Ludwigshafen-on-the-Rhine, Germany, have invented new and useful Improvements in Producing Halogenated Paraffin Hydrocarbons, of which the following is a specification.

Schorlemmer and his pupils in the year 1869 chlorinated ethane by mixing it with chlorin in the dark and then exposing the mixture to the action of diffused daylight (*Annalen*, vol. 150, page 217). They obtained very unsatisfactory yields and the method hitherto usually employed for preparing halogen derivatives of the lower boiling paraffins has been to act on the hydrocarbon with halogen (for instance chlorin) either in the presence or absence of iodin, and either at a low temperature or with the hydrocarbon in the form of vapor. A commercial production of the halogen derivatives in this manner, is however, impossible, because at a low temperature the halogen reacts very slowly, and at a raised temperature part of the product is attacked too vigorously by the halogen, inflammable products are produced and decomposition, with deposition of carbon, takes place. We have now found that these disadvantages are completely removed and that good yields of the monohalogen derivatives of the paraffin hydrocarbons containing more than one carbon atom can be obtained in a good condition as regards purity by effecting the mixing of the vaporized paraffin (preferably in excess) with the halogen in the dark or while the admission of light is restricted, and then subjecting the mixture to the action of ultraviolet rays, for instance to the light of a mercury lamp. In this way the paraffins of low boiling point (such for instance as butane, pentane, hexane, heptane, and their various isomers) can be easily converted into the chlorin or bromin derivatives.

This invention can also be employed for converting the monohalogen derivatives into higher halogenated hydrocarbons. If desired, the temperature of the reaction can be reduced by working under reduced pressure, and this is particularly advantageous when producing dihalogenides or monohalogenides of higher boiling point.

The following examples will serve to illustrate further the nature of our invention and how it can be carried into practical effect, but our invention is not confined to these examples. The parts are by weight.

Example 1: Boil normal hexane in an enameled vessel, on the water-bath, and allow the vapors to pass through a vertical fractionating column and then to pass into a second vessel into which chlorin is led at the same time and in which the mixture of the components takes place. Then allow the mixture containing an excess of hexane vapor to pass, from below, into a third vessel in the middle of which a mercury lamp is burning. The vapors leaving this reaction vessel are passed through a condenser in which the chlorhexane and the excess of hexane condense and are allowed to pass through a siphon into the distillation vessel, while the hydrochloric acid formed during the process is allowed to escape from the circuit. The fractionating column attached to the first vessel is maintained at such a temperature that only hexane is allowed to pass, while chlorhexane remains in the distillation vessel and increases in quantity. When the chlorination has proceeded to a sufficient degree, the reaction product can be purified by fractional distillation. In a similar manner, other paraffin hydrocarbons can be employed, and also bromin can be used instead of chlorin.

Example 2: Place 1,000 parts of that portion of Galician petroleum which boils at from 88° to 92° C. and which has been purified as far as possible by repeated distillation and extraction with sulfuric acid, and which consists chiefly of isoheptane, into a lead-lined vessel provided with a fractionating column, and raise it to boiling point at a pressure of 50 mm. of mercury. Mix the vapors with chlorin and pass them through a vessel containing a mercury lamp, whereupon chlorination takes place. Condense the chlorination product and any unaltered paraffin and allow them to run back into the distillation vessel, while the hydrochloric acid vapors are led away and suitably absorbed. In order to chlorinate the 1,000 parts of hydrocarbon, about 700 parts of chlorin are necessary. The chlorination product consists chiefly of a monochlor-isoheptane which boils at about 140° C. and contains, according to analysis, 26.5% of chlorin. By treating, in a similar manner, the repeatedly purified fraction of Galician petroleum which boils at from 75° to 81° C., a product is obtained boiling between 135° and 145° C., and containing 29.1% of chlorin, while pure monochlor-hexamethylene contains theoretrically 29.8% of chlorin.

Now what we claim is:—

1. The process of producing halogen derivatives of the paraffin series by mixing a paraffin hydrocarbon containing more than one carbon atom in the form of vapor with halogen while restricting the admission of light and then subjecting the mixture to the action of ultraviolet rays.

2. The process of producing halogen derivatives of the paraffin series by mixing a paraffin hydrocarbon containing more than one carbon atom in the form of vapor with halogen while restricting the admission of light and then subjecting the mixture to the action of ultraviolet rays, while carrying out the reaction under reduced pressure.

3. The process of producing halogen derivatives of the paraffin series by mixing a paraffin hydrocarbon containing more than one carbon atom in the form of vapor with halogen in the dark and then subjecting the mixture to the action of ultraviolet rays.

4. The process of producing halogen derivatives of the paraffin series by mixing a paraffin hydrocarbon containing more than one carbon atom in the form of vapor with halogen in the dark and then subjecting the mixture to the action of ultraviolet rays, while carrying out the reaction under reduced pressure.

In testimony whereof we have hereunto set our hands in the presence of two subscribing witnesses.

OTTO GRAUL.
GOTTFRIED HANSCHKE.

Witnesses:
J. ALEC. LLOYD,
JOS. FEIFFER.